US007146199B2

(12) United States Patent
Bush

(10) Patent No.: US 7,146,199 B2
(45) **Date of Patent: *Dec. 5, 2006**

(54) CORDLESS DIGITAL AUDIO HEADPHONE

(76) Inventor: Thomas Bush, 3 Blacksmith La., Poundridge, NY (US) 10576

(*) Notice: Subject to any disclaimer, the term of this patent is extended or adjusted under 35 U.S.C. 154(b) by 325 days.

This patent is subject to a terminal disclaimer.

(21) Appl. No.: 10/057,809

(22) Filed: Dec. 24, 2001

(65) Prior Publication Data

US 2002/0187757 A1 Dec. 12, 2002

Related U.S. Application Data

(63) Continuation of application No. 08/248,049, filed on May 24, 1994, now Pat. No. 6,466,677.

(51) Int. Cl.
*H04M 1/00* (2006.01)

(52) U.S. Cl. ................ 455/575.2; 379/174; 455/569.1; 455/575.1; 455/195.1; 455/294; 455/310; 455/341

(58) Field of Classification Search ............. 455/569.1, 455/575.2, 575.1, 575.6, 566, 572.2, 195.1, 455/294, 310, 341; 379/430, 174; 381/385, 381/370

See application file for complete search history.

(56) References Cited

U.S. PATENT DOCUMENTS

| | | | | |
|---|---|---|---|---|
| 4,371,953 | A | 2/1983 | Hyatt | 365/103 |
| 4,555,795 | A | 11/1985 | Bedini | 381/17 |
| 4,682,363 | A | 7/1987 | Goldfarb | 381/74 |
| 4,691,383 | A * | 9/1987 | DeMars | 455/351 |
| 4,841,587 | A | 6/1989 | Carter et al. | 5/419 |
| 4,996,680 | A * | 2/1991 | Staar | 369/30.71 |
| 5,001,775 | A | 3/1991 | Hayashi et al. | 455/158 |
| 5,077,712 | A | 12/1991 | Nakamichi | 369/6 |
| 5,208,449 | A * | 5/1993 | Eastman et al. | 235/462.3 |
| 5,372,365 | A | 12/1994 | McTeigue et al. | 273/187 |
| 5,475,585 | A | 12/1995 | Bush | 346/401 |
| 5,606,743 | A * | 2/1997 | Vogt et al. | 455/347 |
| RE37,131 | E * | 4/2001 | Mankovitz | 455/66.1 |
| 6,466,677 | B1 * | 10/2002 | Bush | 381/300 |
| 6,695,477 | B1 * | 2/2004 | Nishiguchi et al. | 381/74 |

FOREIGN PATENT DOCUMENTS

| | | | |
|---|---|---|---|
| DE | 4011134 A1 | * | 2/1991 |
| GB | 2261869 | * | 6/1993 |

OTHER PUBLICATIONS

"ASPECAudio-Encoder/-Decoder," Fraunhofer-Institute for Integrated Circuits 1992 Fraunhofer-Geseilschalt.

* cited by examiner

*Primary Examiner*—Edan Orgad
*Assistant Examiner*—Angelica M Perez
(74) *Attorney, Agent, or Firm*—Sofer & Haroun L.L.P.

(57) ABSTRACT

A cordless digital audio headphone is disclosed. The headphone includes a pair of earphones connected to a headband. The earphones provide audible signals. The headphone also includes a memory unit positioned on the headband for containing digitally stored audio information. A processor is disposed on the headband, and is coupled to the memory unit for retrieving the digitally stored information from the memory unit. An analog to digital converter receives the digitally stored audio information, and provides the audible signal to the earphones.

14 Claims, 5 Drawing Sheets

CORDLESS DIGITAL AUDIO HEADPHONE

CROSS-REFERENCE TO RELATED APPLICATIONS

The present application is a continuation application based on, and claims the benefit of priority from, Applicant's U.S. patent application Ser. No. 08/248,049, filed on May 24, 1994, now U.S. Pat. No. 6,466,677 which is incorporated by reference as if set forth in its entirety.

FIELD OF THE INVENTION

This invention relates to audio headphones and more particularly to a cordless digital audio headphone.

BACKGROUND OF THE INVENTION

Within the past decade, small portable sound players like cassette and compact disc (CD) players have become extremely popular.

The portable cassette players usually have a conventional mechanical tape player which may be carried in a shirt's pocket, in a personal carry bag, or may be strapped around the arms, or attached to a belt around the waist. The tape player receives a cassette tape and provides the audio information to a headphone which is connected to the tape player by a cord. Consequently, users can listen to music or other information at any time and any place.

Although portable cassette players are very practical, they also have certain drawbacks. A major drawback is the magnetic head of the player. The magnetic head acts as a transducer for converting magnetic information stored on the cassette tape into electrical signals. If however, the magnetic head does not maintain a fixed distance from the tape, the quality of the sound deteriorates. This deterioration is most noticeable when a user with the portable cassette player tries to walk briskly or jog. During these fast movements, the magnetic head does not stay at a fixed distance from the tape. Consequently, the movement of the magnetic head causes sound distortion.

Similarly CD players retrieve information from optical discs by using light beams. The optical discs are a flat circular plate with an optically writable and readable medium on which data can be stored by selective irradiation of laser beams. Using light beams, the stored data can be read back again. CD players also use mechanical motors for rotating the disc at a high speed and tend to be sensitive to movements.

Another drawback of portable sound players is their weight. Although they have become lighter because of more integrated electronics, the mechanical portion of the players, like the motor and its associated parts, still add to the total weight. Again, this drawback is most noticeable when a user with the portable sound player tries to carry it during exercise. The user has to carry the player by hand or strap it around the arms.

Hence because of the above mentioned drawbacks and other inconvenience associated with the use of portable sound players, there is a need for a portable player which provides a convenient use and a consistent sound quality.

OBJECTIVES AND SUMMARY OF THE INVENTION

It is therefore an object of the present invention to provide a consistent sound quality in a headphone, during abrupt and brisk motion.

Another object of the present invention is to provide desired music by a cordless headphone.

Still another object of the invention is to programmably retrieve desired music in a cordless headphone.

Additional objects, advantages and novel features of the invention will be set forth in part in the description which follows, and in part will become apparent to those skilled in the art upon examination of the following or may be learned by practice of the invention. The objects and advantages of the invention may be realized and attained by means or the instrumentalities and combinations particularly pointed out in the appended claims.

According to the present invention, the foregoing and other objects are attained by providing a cordless digital audio headphone having one or more memory slots positioned on the headband of the headphone for receiving corresponding memory cards. The memory cards contain digitally stored audio information like a musical album. A microprocessor is disposed on the headband, and is coupled to the memory slots for retrieving the digitally stored audio information from the memory card. An analog to digital converter receives the digitally stored audio information, and provides audible signal to the earphone.

According to another aspect of the invention digitally stored audio information is in a form of encoded compressed data. The headphone contains a decoder for decoding said compressed data.

Still other objects and advantages of the present invention will become readily apparent to those skilled in the art from the following detailed description wherein only the preferred embodiment of the invention has been shown. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE DRAWINGS

Figure 1:
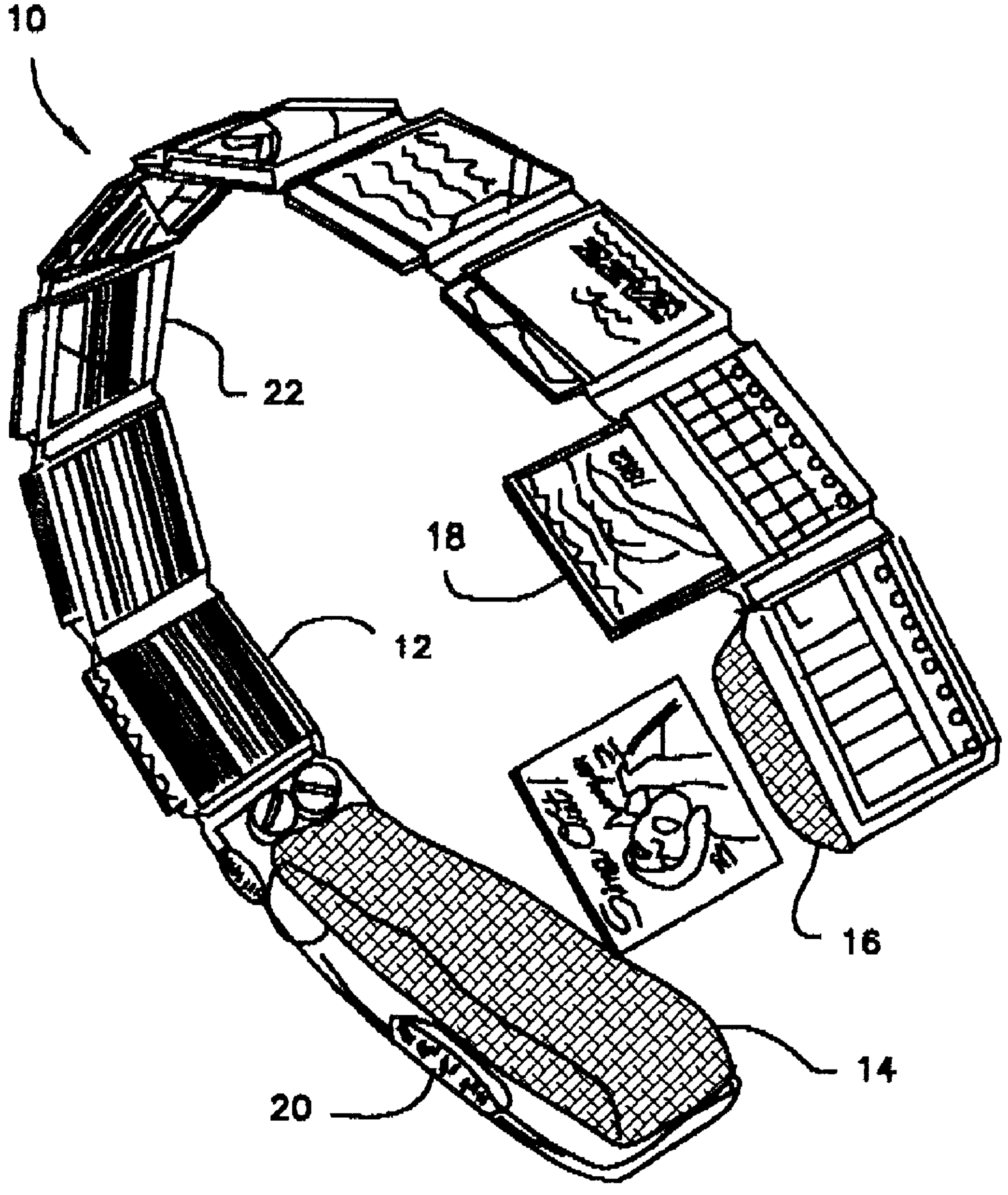
FIG. 1 illustrates one embodiment of a headphone according to the present invention.

FIG. 1 illustrates one embodiment of headphone 10 according to the present invention. Headphone 10 includes two earphones 14 and 16 which can be disposed on a user's ears as other conventional headphones.

Earphones 14 and 16 are interconnected by a headband 22. The headband consists of a series of memory slots 12 interconnected together. Each memory slot 12 receives a memory card 18 which slides in and out of the memory slot. Memory card 18 may be a conventional solid state memory available from Rohm Corp., Antioch, Tenn. Typically, the memory capacity is 8 MB and access time ranges from 100 to 250 ns. Memory card 18 stores digital information corresponding to audio signals like speech or music. The musical information corresponds to a conventional musical album with few recorded songs. A volume control 20 coupled to the headphone adjusts the volume of the sound generated in earphones 14 and 16. The headphone also includes a control screen 78 for displaying information corresponding to the operation of the headphone. The control screen displays an indication of the memory slot from which digitally stored audio data is being retrieved; furthermore it also displays an indication of the title of the album contained in the memory card inserted in the memory slot.

Figure 2:
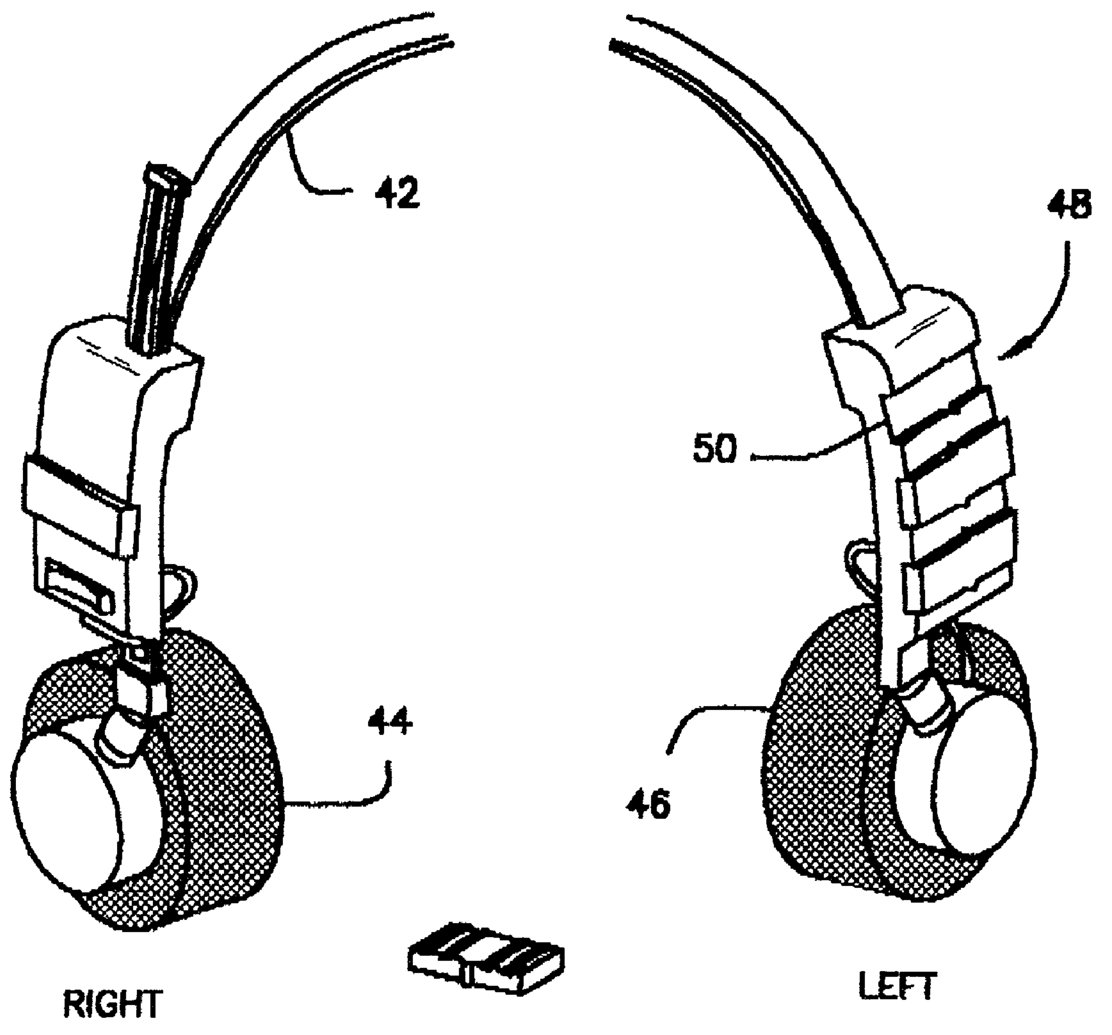
FIG. 2 illustrates another embodiment of a headphone according to the present invention.

FIG. 2 illustrates headphone 40 according to another embodiment of the invention. Headband 42 of headphone 40 interconnects the earphones 44 and 46. A memory unit 48 is disposed on headband 42. The memory unit 48 includes a plurality of memory sockets 50 for receiving memory chips 52. Memory chips 52 store digital information corresponding to audio signals including speech and music.

Figure 3:
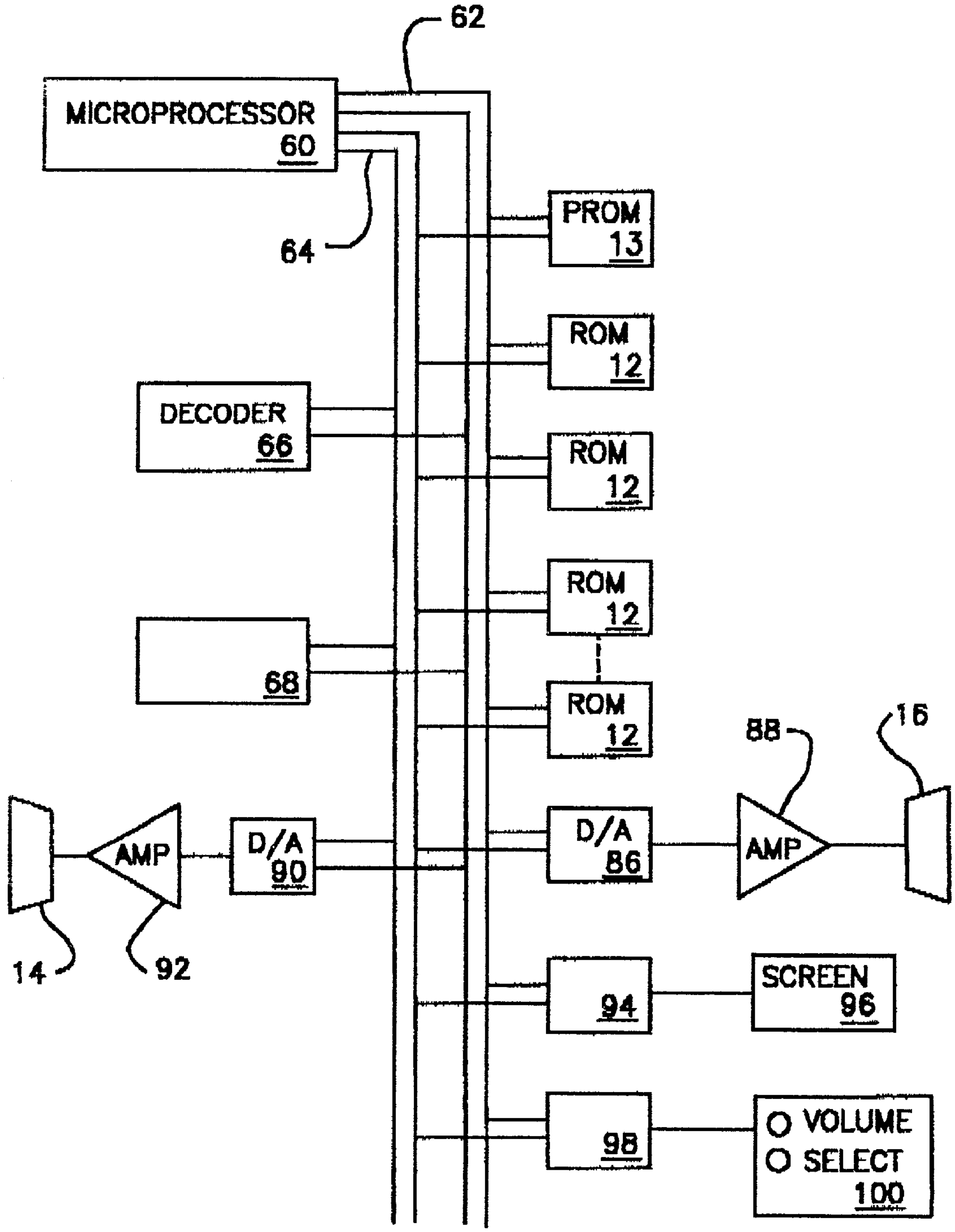
FIG. 3 illustrates the internal block diagram of a headphone according to the present invention.

FIG. 3 illustrates the internal block diagram of one embodiment of the present invention. Microprocessor 60 controls the operation of headphone 10. An address bus 62 and a data bus 64 are coupled to the microprocessor. A programmable memory PROM 13 stores the data corresponding to the operating program of the microprocessor. Memory slots 12 are coupled to the address and the data bus. Similarly a decoder 66 is coupled to the address and the data bus. The output of decoder 66 provides data to an audio processor system 68. The audio processor system 68 receives information corresponding to a monaural type data and provides a binaural type data at its output.

Figure 4:
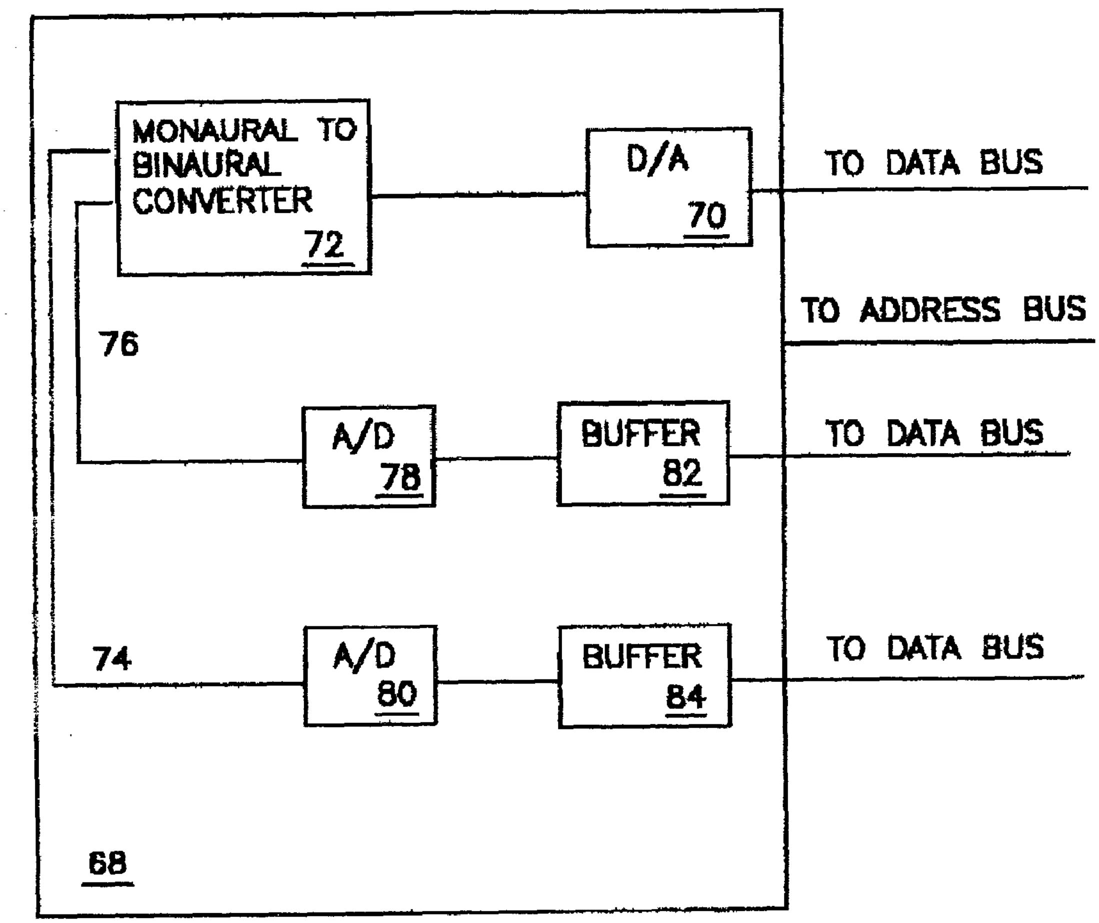
FIG. 4 illustrates the block diagram of the audio processor system used in one embodiment of the present invention.

FIG. 4 illustrates the block diagram of the audio processor system 68. The audio processor includes a digital to analog ("D/A") converter 70 coupled to data bus 64. The output of D/A converter 70 is coupled to a monaural to binaural audio converter 72 as disclosed in the U.S. Pat. No. 4,555,795, disclosure of which is incorporated herein by reference. The monaural to binaural audio converter 72 receives a single audio input, and creates an unbalanced output to a pair of audio outputs 74 and 76. The pair of audio lines 74 and 76 are coupled to A/D converters 78 and 80. The output of A/D converters are coupled to buffer stages 82 and 84 respectively. The output of buffer stages are both coupled to data bus 64.

Referring to FIG. 3, a digital to analog converter 86 is also coupled to the data bus 64 and the address bus 62. The output of the analog converter 86 is coupled to an audio amplifier 88. The output of the audio amplifier in turn is coupled to earphone 16. Similarly, a digital to analog converter 90 is coupled to the data bus 64 and the address bus 62. The output of the digital to analog converter 90 is coupled to an audio amplifier 92. The output of the audio amplifier in turn is coupled to earphone 14.

A screen interface 94 is coupled to the address bus 62 and the data bus 64. The output of the screen interface is coupled to a screen display 96. Similarly an interface 98 is coupled to the address and the data bus. The interface 98 is in turn coupled to a control unit 100 which includes a volume control and a memory selector.

Figure 5:
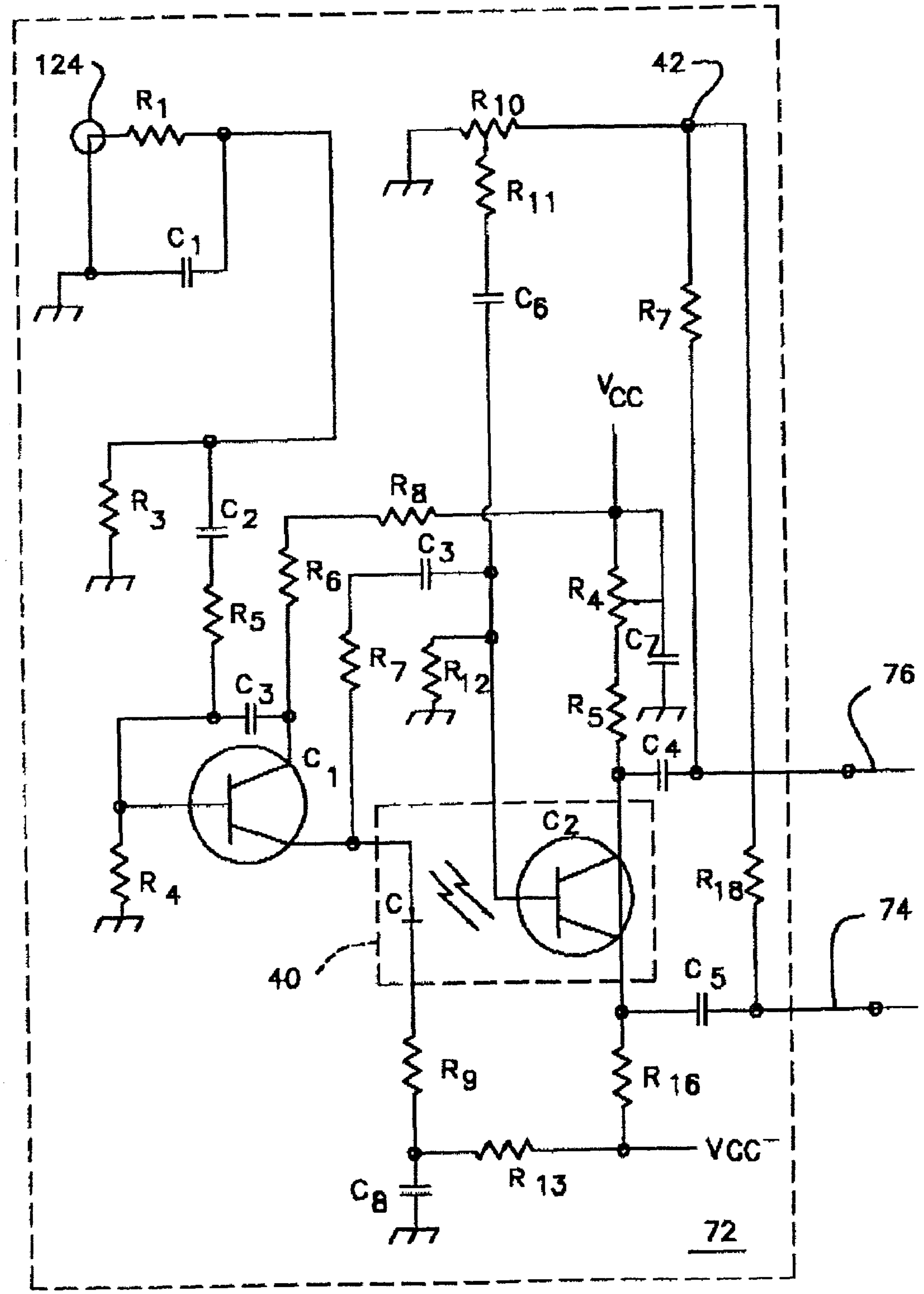
FIG. 5 illustrates circuit diagram of a monaural to binaural audio converter used in the audio processor system of FIG. 4.

The monaural to binaural audio converter 72 is now described in more detail with reference to FIG. 5. Output of D/A converter 70 is coupled to terminal 124 of audio converter 72 for connecting monaural audio data from D/A converter 70 to the monaural to binaural converter 72. The monaural input to terminal 124 is connected through a low pass filter and a coupling capacitor C2 to emitter follower transistor Q1. Transistor Q1 is connected as an emitter follower to provide a low impedance reference point for the operation of the remaining circuitry.

The function of the emitter follower transistor Q1 is primarily to drive light emitting diode D1 which is part of an optical coupling circuit 140, which includes the light emitting diode D1 and phototransistor Q2. On large signal swings of the input signal on emitter follower Q1 the diode D1 will go from almost all the way off to a maximum brightness point. Thus, the LED traverses a large portion of its transfer characteristic and intentionally provides a nonlinear response that is delivered optically to the phototransistor Q2. Thus, the nonlinearity of the diode D2 contributes to generating a difference in the output Q2 which, to ear, produces a subtle difference in the form of a binaural output which might be characterized as similar to stereo but to many listeners actually sounds better.

The LED D1 provides a light output to phototransistor Q2 connected in a phase splitting network comprised of resistors R14, R15 and R16. The resistors are selected to provide an additional unbalanced input in addition to the unbalance due to the nonlinearity of the LED and phototransistor Q2. Thus, an audio signal applied to the input and coupled to the optical coupling circuit 140 will be modified dynamically by the interaction of the nonlinear transfer characteristics of the optical coupler and the frequency selective feed forward and feedback networks, such that a desired binaural output is provided to lines 74 and 76. Once the analog output from audio converter 72 is digitized again by A/D converters 78 and 80, the corresponding digital data is stored at buffers 82 and 84 for retrieval at an appropriate clocking cycle controlled by microprocessor 60.

The audio processor 68 can be replaced by a delay circuit wherein the monaural data provided to it, is delayed for few tenths of milliseconds, and the actual data and delayed data are sent to corresponding earphones.

As described before, memory slots 12 in FIG. 3 can each receive a memory card 18 which stores digital data corresponding to audio information. In order to be able to store a reasonable amount of audio information, the data in memory cards 18 is stored in a compressed state. The data stored in the memory cards may be encoded by one of the compression techniques currently available in the industry. For example, it is possible to store digital information in a memory card by utilizing "adaptive spectral perceptual entropy coding" ("ASPEC"; registered trade mark of TELEFUNKEN Fernseh und Rundtunk GmbH) which is implemented in an audio encoder currently available from Fraunhofer-Institute for Integrated Circuits, Department of Information Technology, Erlangen, Germany. The adaptive compression technique requires 32 kbits of memory space for each second of music. Therefore a three minute song requires approximately 5.7 Mbits of memory space. It can be appreciated by those skilled in the art that better compression techniques currently available may provide for less memory space for the same duration of music.

A person using the digital cordless headphone according to the present invention, may first desire to determine the songs available in the memory. Thus button 86 may be pressed to send a signal to microprocessor 60 to check the appropriate sections of memory card 12 which contain a code corresponding to the title of the songs that are stored. Thereafter, microprocessor 60, sends control signals so that the title codes for each memory card are transmitted to screen display 78. The user can view the list of available songs on the display. Button 86 is pushed again so that one or more of the available songs are programmed to play in sequence. Thereafter, the first selected song begins to play. The data corresponding to the song being played is retrieved from the corresponding memory 12, and sent to decoder 66 for decompression. Thereafter, the decompressed data goes to audio processor 68 to create a stereophonic effect from the musical data. The data corresponding to each channel is sent to the appropriate earphone 16 and 14 respectively, via a corresponding digital to analog converter 80 and 82, and corresponding amplifier 72 and 76. The volume of the music may be controlled by volume control button 88.

Thus the system according to the present invention advantageously provides a convenient digital audio headphone which stores audio information in memory cards which can be easily inserted into memory slots disposed on the headphone.

The invention in its broader aspects therefore is not limited to the specific embodiment shown herein. Departures may be made therefrom within the scope of the accompanying claims without departing from the principles of the invention and without sacrificing its chief advantages.

The invention claimed is:

1. A cordless digital audio headphone comprising:

a pair of earphones connected to said headphone, said earphones providing audible signals;

a memory slot positioned on said headphone for receiving a memory card containing digitally stored audio information, wherein one of a plurality of memory cards is inserted or removed from said memory slot at any time during the use of said headphone;

a processor disposed on said headphone, said processor coupled to said memory slot for retrieving said digitally stored audio information form said memory card; and digital to analog converter for receiving said digitally stored audio information, said converter providing said audible signal to said earphone.

2. The invention according to claim 1, wherein said headphone contains a plurality of said memory slots for receiving a corresponding memory card, said processor programmably retrieving said digitally stored audio information from said memory cards.

3. The invention according to claim 2 further comprising a headband defined by a plurality of memory slots linked together.

4. The invention according to claim 3 wherein said memory slots define the entire headband.

5. The invention according to claim 2, wherein said memory cards contain information corresponding to musical albums.

6. The invention according to claim 5, further comprising control buttons coupled to said microprocessor for selecting a memory slot from which audio information is to be retrieved and for controlling the volume of audio signal being provided by said earphones.

7. The invention according to claim 6, further comprising a display screen controlled by said processor for displaying information corresponding to the operation of said headphone including:

an indication of a memory slot from which digitally stored audio data is being retrieved; and an indication of the title of album contained in the memory card inserted in said memory slot.

8. A cordless digital audio headphone comprising:

a headband for resting said headphone over a user's head;

a microprocessor disposed on said headphone for controlling the operation of said headphone, said microprocessor coupled to an address bus and a data bus;

a plurality of memory slots disposed on said headphone each coupled to said address bus and said data bus, said memory slots receiving memory cards containing digitally stored audio information; and a pair of output devices each including, a digital to analog converter coupled to said address bus and said data bus for receiving said digitally stored audio information, an audio amplifier for receiving analog signal provided by said digital to analog converter, and providing an amplified signal corresponding to said audio information; and an earphone for receiving said amplified audio signal and providing audio signal.

9. The invention according to claim 8, wherein said memory cards contain information corresponding to musical albums.

10. The invention according to claim 9, further comprising control buttons coupled to said address bus and said data bus for selecting a memory slot from which audio information is to be retrieved and for controlling the volume of audio signal being provided by said earphones.

11. The invention according to claim 10, further comprising a display screen coupled to said address bus and said data bus for displaying information corresponding to the operation of said headphone including:

an indication of a memory slot from which digitally stored audio data is being retrieved; and an indication of the title of album contained in the memory card inserted in said memory slot.

12. The invention according to claim 11 wherein said digitally stored audio information is in a form of encoded compressed data.

13. The invention according to claim 12, wherein said headphone further comprises a decoder coupled to said address bus and said data bus for decoding said compressed data.

14. The invention according to claim 13, wherein said decoder provides decompressed data to an audio processor, said audio processor being coupled to said data bus and said address bus for providing binaural sound to said earphones.

* * * * *